March 31, 1959  J. J. OLIVERE  2,879,606
CARPENTER'S LEVEL
Filed April 27, 1954
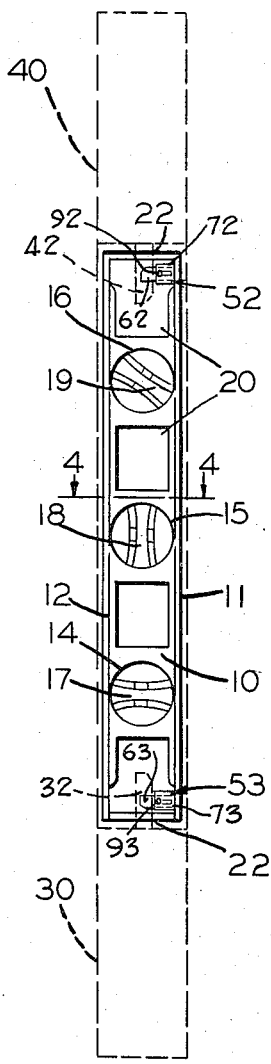
FIG. 1
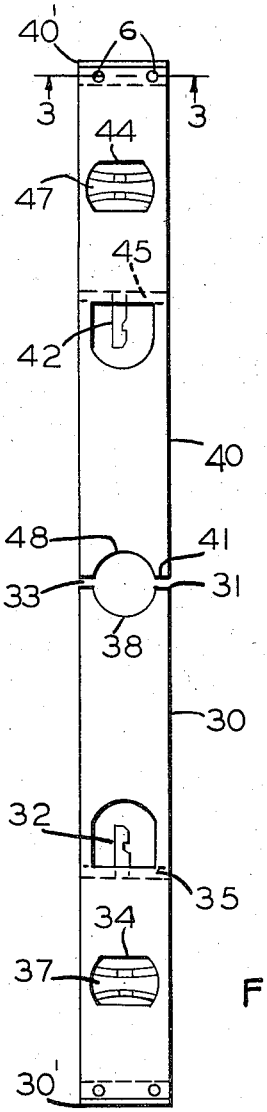
FIG. 2
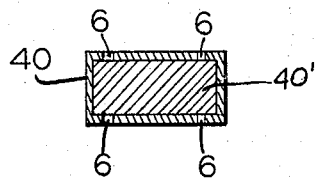
FIG. 3
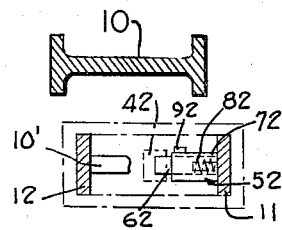
FIG. 4
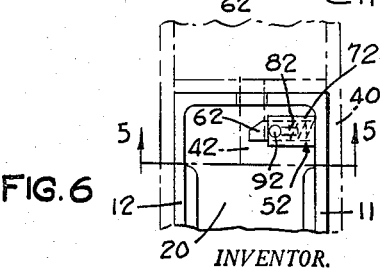
FIG. 5
FIG. 6
INVENTOR.
JAMES J. OLIVERE
BY
Connolly & Hutz
HIS ATTORNEYS

United States Patent Office 2,879,606
Patented Mar. 31, 1959

2,879,606

CARPENTER'S LEVEL

James J. Olivere, Wilmington, Del.

Application April 27, 1954, Serial No. 425,806

2 Claims. (Cl. 33—208)

This invention relates to a novel improvement in the well-known carpenter's level. More specifically, the invention relates to a pair of identical adaptor devices which are constructed for application on standard type levels to render the same more suitable for various operations in the building trades, particularly in hanging doors, squaring door frames, setting windows, and the like.

The carpenter's level is an ancient and universally employed tool in various types of applications where precise alignment between adjacent structural components is desired. It is conventional to construct these tools in various shapes and sizes but the most common form employed by artisans in the building trades is a rectangular bar-like member, normally varying between 2 and 4 feet in length. The bar is usually formed of a light-weight metal, plastic or wood and is drilled or bored at several points along its length for reception of the well-known glass or plastic cylinders containing a liquid and a floating level indicator, the cylinders normally bearing indicia in the form of lines and the indicator normally comprising a bubble which is adapted to move relative to the indicia lines to indicate a relative alignment of the tool and the object it contacts with the horizontal and/or vertical.

To this date no one has devised a convenient and inexpensive level arrangement which is suitable for multiple applications in the building trades and which is at the same time suitable for simplified door hanging and door frame aligning operations. In particular, even though this form of tool has been used since Biblical times, no one has devised an arrangement whereby a level of convenient size and weight can be successfully employed in the hanging of door frames and squaring of door jambs, which usually exceed 6 feet in length. As a result, it has been necessary for most members of the building trade, and particularly carpenters, to employ several levels in graduated sizes for different applications, and in particular, to use a special over-sized level for hanging doors and squaring door frames.

Accordingly, it is an object of the present invention to overcome these disadvantages of the prior art and to provide a simplified carpenter's level arrangement which is suitable for universal application in the building trades. It is a further object of the invention to provide a carpenter's level which includes telescoping parts whereby the size of the level may be changed at will. Yet another object of the invention is to provide a multiple component level arrangement which can also function as an extensible straight edge and linear scale. Other and distinct objects will become apparent from the description and claims which follow.

Broadly, the invention comprises a three-piece construction in which one of the members takes the form of a conventional bar-like level element and the other two members are identical sleeve elements formed to fit over the bar-like member with a close-tolerance, but free sliding fit. Preferably, each of the sleeve elements carries an additional bubble type level indicator near its exterior end for cooperation with the bubble members in the central level element. In a preferred form of the invention, each of the sleeve members carries detent means for cooperation with the central level member for the purpose of interchangeably, frictionally locking the sleeve members thereto.

Having broadly disclosed the invention, reference will now be made to the annexed drawings in describing a preferred example of the same, and in which:

Fig. 1 is a side view of the central bar-like level member with graphical representation of its cooperation with the extensible sleeve member, Fig. 2 is a side view of the sleeve members adapted to cooperate with the central bar of Fig. 1, Figs. 3 and 4 are cross-sectional views taken respectively through Figs. 2 and 1 along the lines 3—3 and 4—4 and looking in the direction of the arrows, Fig. 5 is a cross-sectional view taken through Fig. 6 along the line 5—5 and looking in the direction of the arrows, and Fig. 6 is an enlarged view of a portion of Fig. 1.

As shown in Figs. 1 and 3 of the drawings, the improved carpenter's level, according to the invention, employs a central bar-like member 10 which, in the preferred form, comprises an I beam member of plastic or a light-weight metal such as aluminum. The member includes a pair of precision finished flange members 11 and 12 along the upper and lower edges of its axial extent and is formed as by casting, drilling, boring, etc., with three axially aligned transverse openings 14, 15 and 16. Other openings 20 are also provided to reduce the weight of the member.

The openings 14, 15 and 16 support conventional bubble type level indicators such as 17, 18 and 19, it being understood that two level indicators are normally positioned in side by side relationship in each opening and fixedly retained therein by a suitable clamp, cement or other bonding arrangement (not illustrated). In the present invention it is preferred to orient one of the bubble elements 19 at an angle of 45° with respect to its adjacent bubble element to increase the utility of the level member and facilitate marking 45° angles without recourse to a separate tool.

As will be readily understood by those skilled in the art, the bubbles 17 and 18 are precisely aligned along a common center line axially of the bar member whereby free movement of the bubbles in cooperation with indicia marks carried by the containers 17, 18, 19 and 20 will serve to indicate the relative horizontal and/or vertical alignment of any surface against which the flange elements 11 or 12 may be brought to bear.

In order to more readily adapt the beam member 10 for cooperation with the sleeve elements of the present invention, the respective ends of the central web are drilled at each end as at 22, to provide an axial channelway for reception of a locking bar element 32 or 42. A detent mechanism 52, 53 is positioned adjacent each of the axial channelways at the respective ends of the member. The detent device is of conventional form and need not be further explained.

The member 10 is formed of a size between two and four feet in length and is of such weight as to be readily and easily manipulated by one hand. It will be appreciated that the particular configuration illustrated in the drawing is merely by way of example and is not to be construed as being the only available shape in which the level may be formed.

For cooperation with the central member 10 of Fig. 1 and in order to increase the effectiveness of the same, a pair of identical sleeve elements 30 and 40 are provided as shown in Fig. 2. Like structures on the respective sleeve members are indicated by like numerical subscripts, and only one will be particularly described. As shown in the drawing, the sleeve member 30 is of tubular form and has a rectangular cross-section (see Fig. 3). Preferably, the members 30 and 40 comprise extruded tubes of aluminum of between 1/16" and 3/8" thickness. The outer end of each tube is closed as by welding, soldering or otherwise affixing a plug member 30', 40' in the end thereof, for example, by securing means at 6 and/or by swaging or otherwise shaping one end of the tube. The tubular member is cut away near the closed end, as at 34, for reception of a bubble type indicator 37 which is affixed in the opening in a conventional manner by cement or paste, etc., and which is so positioned as to coincide with the center line of the tube. An interior plug member 35 carrying a projecting detent or locking bar element 32 is fixed within the tubular member intermediate the bubble unit 37 and the open end 33. This open end is cut away or relieved as shown at 38 and includes a blunt terminal edge face 31.

The arrangement is such that the tubular sleeve 30 and its companion member 40 may be slid over the respective ends of member 10 in the manner illustrated in Fig. 1 of the drawings to bring the leading edges 31, 41 of the sleeve members into contacting relationship at the center of the bubble element 18. The plug elements 35 and 45, with their integral locking-bar members 32 and 42, are so positioned with respect to the leading edges 31 and 41 that the bars enter and are frictionally locked in the openings 22 of the central member by the cooperating detents 52, 53.

Detents 52 and 53, as shown in detail in Figs. 1, 5 and 6, respectively, include latches 62 and 63 which respectively slide within slotted members 72 and 73. Springs 82 and 83 (not shown) maintain latches 62 and 63 forced resiliently outwardly, and manually operable projections 92 and 93 retain latches 62 and 63 within members 72 and 73 and permit latches 62 and 63 to be manually released from locking bars 32 or 42.

It will be noted that when the sleeves are positioned in assembled relationship over member 10 that the surfaces 38 and 48 provide visual access to the central level indicator 18 of member 10 which thereby cooperates with the level indicators 37 and 47 in the well-known manner.

The present arrangement provides a very simple and inexpensive construction for rapidly adjusting a conventional sized level for jobs requiring a much longer tool. It will thus be noted that telescoping of the sleeves 30 and 40 over member 10 serves to elongate the level by at least 50 percent and which length may be further increased as desired through the simple expedient of retracting each of the sleeve members towards the outer end of the central member 10; the level indicators 18, 37 and 47 remaining in precise alignment by reason of the fact that the flange surfaces 11 and 12 are precision finished to mate with the internal walls of the sleeve members within very close tolerances.

If desired, in order to reduce weight and to increase the effectiveness of the level arrangement, the sleeve members may be perforated at various points along the sidewalls in the manner of the openings 34 and 44, or in the alternative, a single slot may be formed in the sidewalls of the sleeve for slightly less than its full length. In either event, the arrangement will facilitate ready visual examination of not only the central level indicator 18 but also level indicators 17, 19 and 20 of the center member 10.

A particular feature of the invention is the provision of a precise mating of the leading edges 31 and 41 of the respective sleeve members at the center line of the central level indicator 18 whereby the exterior surface of the tubular sleeves can be formed with calibrated scale markings in such manner that the assembled unit can replace conventional yardsticks and other linear measuring elements in a given operation. In practice, it is preferred to provide a pair of parallel scale indicia along the respective upper and lower exterior edges of the sleeve members 30 and 40, one group of which may be so graduated from the closed end of the sleeve 30 to the closed end of sleeve 40 in a continuous progressive manner, and the other group of which would comprise identical graduated scale markings beginning at the respective leading edges 31 and 41 and terminating at the external closed ends of the respective sleeves. The latter markings are adapted to cooperate with similar markings on the outer surface of flanges 11 and 12 which are so oriented as to have a zero line at the vertical center line above the level indicator 18 and to be graduated outwardly towards the respective ends of the member 10. With such arrangement, the level can be used as a measuring element regardless of the relative position of sleeves 30 and 40 on the central member.

As many apparently widely different embodiments of the above invention may be made without departing from the spirit and scope hereof, it is to be understood that this invention is not limited, except as defined in the appended claims.

What is claimed is:

1. A carpenter's level comprising an elongated central member approximately between 2 and 4 feet in length, a plurality of level indicating means carried at spaced intervals by said central member to make said central member usable as a carpenter's level of conventional size, a pair of elongated tubular sleeve elements telescopically mounted over opposite ends of said central member to meet each other approximately at the center of said central member, said sleeve elements extending beyond the ends of said central member to extend the effective length of said level to a length at least 50% greater than said central member, additional level indicating means carried by each of said sleeve elements, said additional level indicating means being disposed outside the adjacent ends of said central member, and said sleeves being removable from said central member to permit said central member to be itself used as a level of conventional size and to permit all of said elements to be conveniently transported.

2. A carpenter's level as set forth in claim 1 wherein one of said level indicating means carried by said central member is centered at the point where said sleeve elements meet each other, and the adjacent surfaces of said sleeve elements are cut out to permit said level indicating means to be seen when said sleeve elements are mounted over said central member.

References Cited in the file of this patent
UNITED STATES PATENTS 747,850     Bihlman _____ Dec. 22, 1903
1,586,153    Hunter _____ May 25, 1926